(12) United States Patent
Kowalski et al.

(10) Patent No.: US 8,551,597 B2
(45) Date of Patent: Oct. 8, 2013

(54) AIRFLOW PAD

(75) Inventors: Raymond A. Kowalski, Yorba Linda, CA (US); John R. Welday, Suwanee, GA (US)

(73) Assignee: Hexacomb Corporation, Deerfield, IL (US)

( * ) Notice: Subject to any disclaimer, the term of this patent is extended or adjusted under 35 U.S.C. 154(b) by 394 days.

(21) Appl. No.: 12/794,387

(22) Filed: Jun. 4, 2010

(65) Prior Publication Data

US 2011/0300329 A1 Dec. 8, 2011

(51) Int. Cl.
- *B32B 3/30* (2006.01)
- *B32B 3/12* (2006.01)
- *B65D 19/20* (2006.01)
- *B65D 19/34* (2006.01)

(52) U.S. Cl.
USPC ........... 428/116; 428/154; 428/167; 428/186; 454/250; 229/120; 229/916

(58) Field of Classification Search
USPC ................. 428/116–118, 167, 188, 154, 186; 454/250; 217/42; 181/290, 292; 248/346.4; 108/53.1, 51.11, 56.1; 229/120, 916, 119, 229/120.02; 156/292, 197; 52/302.1, 144; 34/614, 618; 261/DIG. 3; D7/553.3; 5/724
See application file for complete search history.

(56) References Cited

U.S. PATENT DOCUMENTS

| | | | | |
|---|---|---|---|---|
| 2,728,479 | A * | 12/1955 | Wheeler | 428/116 |
| 4,667,823 | A * | 5/1987 | Wolfe et al. | 206/392 |
| 4,832,228 | A | 5/1989 | Hickey | |
| 5,493,962 | A * | 2/1996 | McCarthy | 108/51.3 |
| 5,680,934 | A * | 10/1997 | Jaegers et al. | 206/586 |
| D412,604 | S | 8/1999 | Hickey | |
| 5,996,509 | A * | 12/1999 | Lai | 108/51.3 |
| 6,033,167 | A * | 3/2000 | Bourgeois | 410/119 |
| 6,435,108 | B2 * | 8/2002 | Braley | 108/51.3 |
| 2008/0131654 | A1 * | 6/2008 | Bradford et al. | 428/118 |

* cited by examiner

*Primary Examiner* — Callie Shosho
*Assistant Examiner* — Nicholas W Jordan
(74) *Attorney, Agent, or Firm* — Klarquist Sparkman, LLP

(57) ABSTRACT

An airflow pad is disclosed that includes first and second external facings of paper material extending between edge portions of the panel and having interior portions disposed remotely from the edge portions. A low-density core of paper material disposed between and associating the external facings to provide stiffness to the panel. The pad defines a network of channels open at least one of the edge portions and at the interior portion of the first facing allowing airflow therebetween.

16 Claims, 4 Drawing Sheets

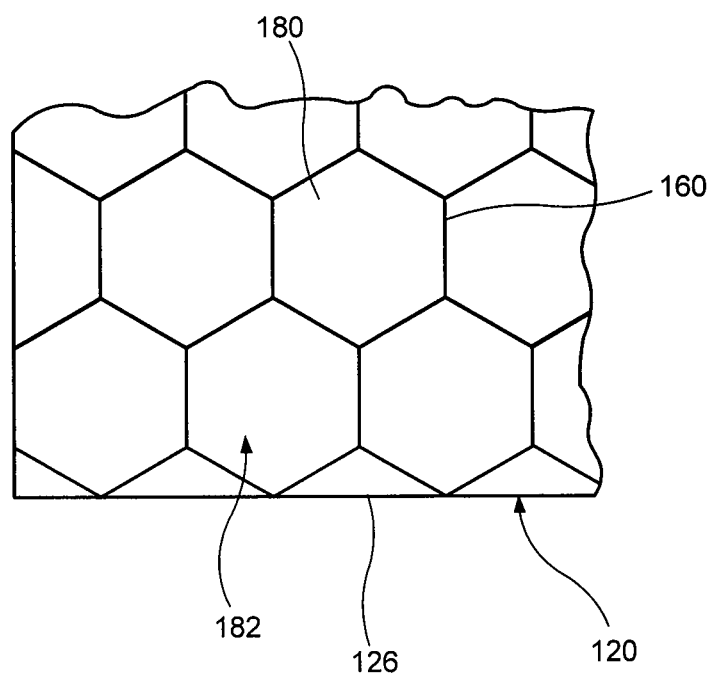
F I G. 1

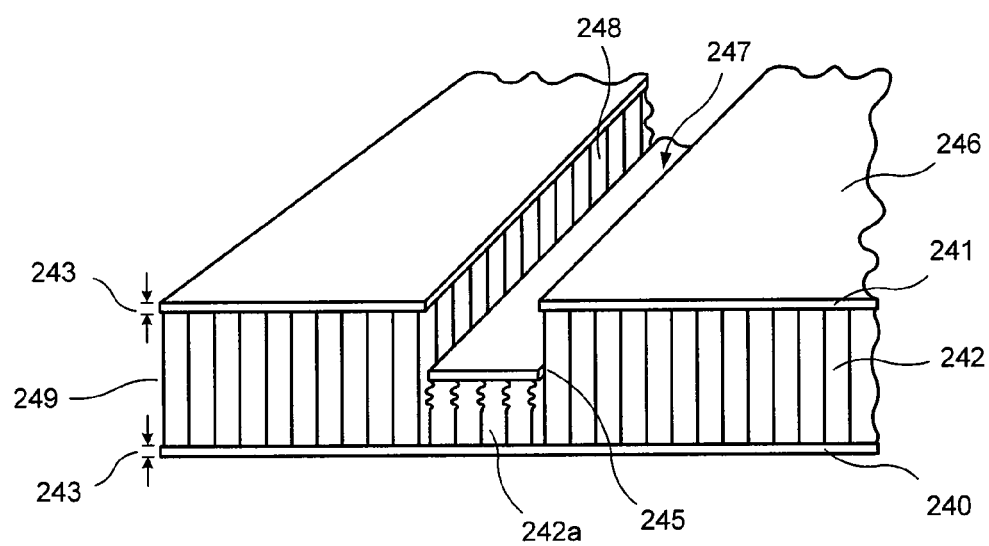
F I G. 2

AIRFLOW PAD

TECHNICAL FIELD

The present disclosure relates to pads that allow airflow, such as for product cooling.

BACKGROUND

A large volume of animal food products such as chicken, turkey, beef, pork and seafood products (including livers, hearts, other parts, de-boned meat and the like) are chilled or frozen and shipped within and exported from the United States in boxes. For example, chicken thighs, legs or quarters may be shipped in cartons of about 22-28 inches in length by 14-20 inches in width by 4-12 inches in height. A typical box size for use with the present disclosure may be 24 inches by 16 inches with the height of the box varied to hold the particular products to be shipped, for example, 12 inches. A box of such dimensions containing chilled or frozen animal food product parts may weigh on the order of 30 to 45 pounds, or more.

After the food products are processed and placed in their respective boxes, the food products must be chilled to the appropriate temperature for storage, transportation, and eventual purchase by the end consumer. It may be desirable to chill food product to approximately 32.5-35 degrees Fahrenheit for fresh (not frozen) products, or to approximately −40 degrees or colder for frozen products.

Boxes containing food are placed in stacks on top of pallets for transportation, storage, or chilling. Pallets may be placed within a blast freezer/chiller/cold storage warehouse. Within such chilling area, the stacked boxes may be separated by freezer spacers, which are typically made of plastic or polymer material, and thus are relatively heavy, making them difficult to handle, ship, and store. Due to their cost, they are reused after a cooling cycle by removing from the stacked boxes, with the boxes reloaded onto a pallet for shipping, and spacers then restacked among a new stack of boxes that are to be cooled.

An airflow pad is needed that can improve the cooling processing of products.

SUMMARY

One embodiment of an airflow pad includes first and second external facings of paper material extending between edge portions of the panel and having interior portions disposed remotely from the edge portions. A low-density core of paper material may be disposed between and associating the external facings to provide stiffness to the panel. The pad may define a plurality of channels open at least one of the edge portions and at the interior portion of the first facing allowing airflow therebetween. A preferred low-density core includes honeycomb material, although alternative cores can include other suitable materials, like a corrugated material. The exterior facings may be made of a high-density paper material.

The channels can be open along the external surface of the first facing, for example the top surface of the top facing. The edge portion may include a lateral exterior edge extending between the first and second facings, the channels being open at the exterior edge. The channels may be open at the exterior edge at different sides of the pad to allow airflow therebetween. The channels may be open at the exterior edges on opposite sides of the pad to allow airflow therebetween. The channels may be open at the exterior edges on all sides of the pad to allow airflow therebetween. The channels may be open substantially entirely along the external surface.

The channels can be formed of indentations extending along an external surface of the first facing. The core under the channels may be crushed, and the facing may be cut on lateral sides of the channels, such as in a cut and crush operation, so that a portion of the facing remains on a bottom of the channel recessed from the external surface of the first facing.

The embodiment may further include ventilation openings extending through both facings to allow airflow therethrough. The ventilation openings may include connected openings, and the channels are open to the connected openings to allow airflow between the ventilation openings and the edge portion. The connected openings may be open to the channels on a plurality of sides thereof to allow airflow thereacross. The ventilation openings may include isolated openings that are uncommunicated to the channels.

While multiple embodiments are disclosed, still other embodiments of the present disclosure will become apparent to those skilled in the art from the following detailed description, which shows and describes illustrative embodiments. As will be realized, the invention is capable of modification in various aspects, all without departing from the spirit and scope of the present disclosure. Accordingly, the drawings and detailed descriptions are to be regarded as illustrative in nature, and not restrictive.

BRIEF DESCRIPTION OF THE FIGURES

While the specification concludes with claims particularly pointing out and distinctly claiming the subject matter that is regarded as forming the various embodiments of the present disclosure, it is believed that the embodiments will be better understood from the following description taken in conjunction with the accompanying figures, in which:

FIG. 1 is a top cross-sectional view showing a portion of the core of a airflow pad in accordance with a preferred embodiment of the invention;

FIG. 2 is a side cross-sectional view thereof showing a channel;

DETAILED DESCRIPTION

Figure 4:
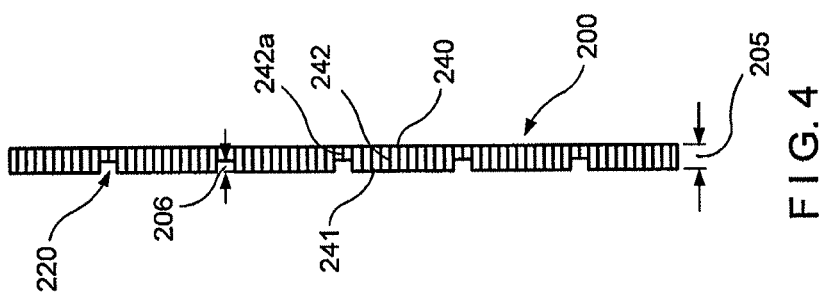
FIG. 4 is a side view thereof.

The present disclosure describes devices for use, for example, for boxed food-product cooling, transportation, and storage systems. The airflow pads can be used to separate the boxes and allow and enhance airflow around and in association with the boxes or other products.

Referring to FIG. 1, the preferred embodiment of an airflow panel 120 has a honeycomb core structure 180. The honeycomb structure 180 can have walls 160, defining cells of six walls 160 as shown in FIG. 1, having a hexagonal shape, an octagonal shape, or other suitable shape, such as 3 or 4-sided shapes. The honeycomb structure 180 can provide for a large number of air spaces 182 within or in between the walls 160 to provide for a low-density honeycomb material that can be mostly air by volume. For example, the panels can comprise a material having over 60%, 70%, or 90% airspace, although any amount of airspace may be acceptable. In other embodiments, a corrugated or other low-density structure may be used in place of the honeycomb structure 180. Other materials may also be used.

Referring now to FIG. 2, the airflow pad can further include an external top facing 241 and an external bottom facing 240, affixed on opposite sides of a core 242, which preferably includes one or more layers of the honeycomb structure 180. Multiple honeycomb layers can be separated by additional sheets, although a single layer is preferred. An internal surface of each facing 241, 240 faces the core 242, and is preferably adhered thereto, and the external surface of each facing can be or include an external surface of the pad. The top and bottom facings 240,241 are preferably significantly denser than the core, due to their configuration, although they can be made of the same material. In the preferred embodiment, the top and bottom facings 241,240 generally do not have airspace within the sheet material. In some embodiments, the facings 240,241 can be made with a material having less than 25% airspace, and preferably less than 10% airspace. Examples of the density of the facings 240,241 are between 31 lb./1000 sq. ft. and 90 lb./1000 sq. ft., and preferably about 56 lb./1000 sq. ft. The facings 240,241, which can be bottom and top facings, respectively, are preferably made of a single sheet of material, but may be made of multiple plies, for instance.

Various adhesives can be used to adhere the facings to the honeycomb core 242, such as PVA glue, EVA glue, water based adhesives, starch based adhesives, HotMelt®, and solventless adhesives. Preferred embodiments may utilize PVA glue, especially as between honeycomb walls 60. The thickness 243 of layers facing 241, 240 may vary, for example, between 0.00788 inches in the case of a 31 lb./1000 sq. ft. density layer, and 0.02728 inches in the case of a 90 lb./1000 sq. ft. density layer. In preferred embodiments, the thickness 243 may vary linearly between 0.00788 inches and 0.02728 inches for layer densities between 31 and 90 lb./sq. ft., as the thickness may vary generally linearly in proportion to density.

The panel structure of the preferred embodiment provides a panel capable of handling loads up to about 2000, 2250, or 2500 lbs. All portions of the panel structure, including facings 241,240 and interior structure 242, can be made of sheet material, such as paper material, which can provide savings on shipping costs and can be recyclable and biodegradable, and can provide a lightweight, low-cost structure. Furthermore, the use of paper materials can be cost competitive to materials such as wood, metal, and plastic, while at the same time offering benefits that are not available through the use of traditional wood materials. Paper products can be made lighter than wood, plastic, or metal products, and when formed into a honeycomb structure may have remarkable strength. Because of the ease of working with paper materials and the availability of various honeycomb structures, products can be manufactured in a variety of shapes and sizes to meet any particular requirements. Exemplary honeycomb panels which may be used with the present disclosure include those which are produced under the Hexacomb® brand by Pregis Corporation.

Figure 3:
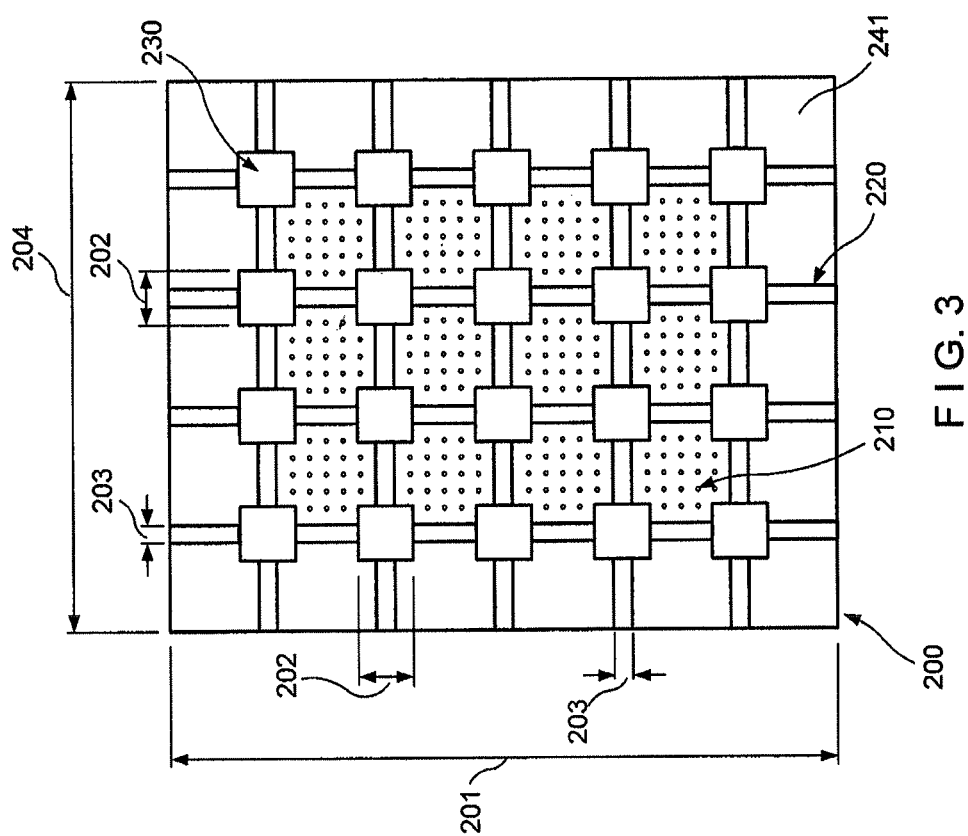
FIG. 3 is a top view of the pad.

Referring to FIGS. 2-4, an airflow pad 200 formed from a panel in accordance with the present disclosure may be generally rectangular in shape or have another suitable shape, and may have a length and width which are each many times greater in dimension than its height. For example, length 201 and width 204 of pad 200 may preferably be between about 20 and 100 inches, more preferably between 40 and 60 inches with one embodiment being around 40×48 inches. Height 205 may preferably be between 0.5 and 5 inches, and more preferably about 1 to 3 inches, with a preferred embodiment being about 1.5 inches. It will be appreciated that other dimensions and ranges of dimensions may be used. (FIG. 2 is not to scale for convenience of illustration.)

The embodiment shown in FIG. 3 of the airflow pad 200 has an edge portion 249 located about the periphery of the pad 200 near its edge, and an interior portion 246 disposed remotely from the edge on the interior of the pad 200 when viewed from the top. A lateral exterior edge extends about the perimeter of the pad 200 and has a thickness that is preferably defined by the height of the pad 205.

Airflow pad 200 can have one or more airflow enhancing portions. Airflow enhancing portions are included on the pad to allow and direct air to flow across the pad, parallel to the major surfaces thereof, which in the preferred embodiment is parallel to the facings 240,241, and preferably also vertically through the pad. The airflow enhancing portions include passages of various sizes, shapes, which are preferably arranged in a network along the pad.

Perforations 210, as shown in FIG. 3, may be located at various positions along the pad 200. Perforation 210 may be generally circular, or "pin-punched" shaped, and may preferably be sized between 0.05 inches and 0.2 inches in diameter, although other larger or smaller sizes can be used depending on the application. In one embodiment, they have a diameter of about 0.125 inches. The perforations are preferably grouped along areas of the pad that are not otherwise traversed by other airflow enhancing portions. Other shapes and groupings of perforations are also possible. Preferably, perforations 210 extend completely through the entire height of the pad 200, between the top facing 241 and the bottom facing 240. Perforations 210 may be grouped in clusters, such as only in the interior portion 246 away from the edge portions 249 as shown in FIG. 2 to enhance airflow between boxes stacked away from the edges, or they may be randomly or uniformly located across the pad 200. Perforations allow for air to flow freely across the pad 200 through the facings 240,241 and interior structure 242, thereby allowing air to more easily penetrate a stack of product containing boxes for efficient cooling.

Channels 220 may be formed extending horizontally along the length and/or width of the pad 200 or a portion thereof. Preferably, the channels 220 are only provided on the external surface, such as only on the upper facing 241, although alternative embodiments have channels on both surfaces. Channels 220 in the preferred embodiment are formed as indentations in the external surface. Although channels are shown in FIGS. 2-4 extend along the width and length of the pad 200, it will be appreciated that channels may extend at other angles, such as diagonally, across one or both of the surfaces of the pad 200 in alternative embodiments.

The channels 220 depicted extend the entire length or width of the upper facing 241, which allows air to flow completely from one side of the exterior of the pad 200 to the interior portions when the pad 200 is within a stack of product boxes, such that the air can enter on one channel opening on a side of the pad 200 and exit from another opening on another side. Alternatively, channels may be formed only part-way across the surface, and other shapes or configurations of channels are also possible.

Preferably, a plurality of channels 220 is provided on the pad 200 to form a network of airflow passageways, which is preferably connected with connected openings, which can be enlarged flow areas 230. For example, 5 channels are shown in FIGS. 3 and 4 in the length dimension, and 4 channels are shown in the width dimension. In this manner, channels may intersect at various positions on the interior portions of the channeled surface of the pad 200, allowing the air to flow out of an adjacent side of the pad 200 from where it entered, or back out another channel outlet on the same side from where it entered. Air can also enter or exit the channels 220 vertically through the enlarged flow areas 230 perpendicularly to the channels and facing surfaces, and since the channels 200 in the preferred embodiment are open on their top side, air can also enter or exit from the top. The channels are preferably closed at their bottom and lateral sides. Channels 220 may have a width 203 which is preferably uniform and between 0.5 and 3 inches, and more preferably between 1.0 and 2.0 inches, for example about 1.5 inches. Channels 220 can have a depth 206, which is also preferably uniform, between 0.25 and 1.5 inches, more preferably between 0.5 and 1.0 inches, and for example about 0.75 inches, depending on the depth of the pad. Other depths can be used, and the preferred depth of the channels is between about 10% and the thickness 205 of the pad 200, and more preferably between about one and three quarters of the pad thickness 205. In one embodiment, the channels 220 have a depth of about half the pad thickness. In some embodiments, the width of each channels is about a thirtieth to a about a twentieth or tenth of the pad width or length, and the cumulative widths of the channels seen from a side of the pad can be between a tenth and a fifth of the pad width or length, with an embodiment being about a seventh. The width 202, depth 206, and number of channels 220 and the respective ratios of these to the dimensions of the pad can be selected depending on the dimensions, number, and cooling requirements of the boxes to be stacked therewith.

Through enlarged flow areas 230 are provided in the preferred embodiment as through holes, which may be provided as cutouts, formed vertically completely through the pad 200 to allow air to flow across the pad between facings 240 and 241 of the pad. In this manner, cutouts function similarly to perforations, as described above, but they are preferably significantly larger and therefore allow more air through the network of channels to directly contact the boxes above and below the pad 200. As shown in FIG. 3, through holes 230 may be square shaped and evenly distributed along intersections of channels 220 that extend in different directions, although other shapes and configurations are possible. Preferably, the length and width of enlarged flow areas 230 may be between about 3 and 5 inches, for example around 4 inches. The length and width can be between about 5% and 25% of the length or width of the pad 200, and between about 100% to 1000% the width of the channels 220. The width of the enlarged flow areas 230 viewed from above is preferably significantly larger than the width of the channels 220, being preferably at least twice as wide as the channels 220, and in some embodiments more than 3, 5, or ten times as wide, but preferably leaving at least 40%, 50%, or 60% of the surface of the pad 200 in place (not punched away), to retain pad structural integrity. Where the enlarged flow areas 230 are disposed at the intersection of the channels 220, they communicate air between the facings 240, 241 and the edge portions 249, and preferably with the outer edge of the pad 200. In the embodiment shown at FIG. 3 there are 9 channels 220, with 20 channel intersections (and 20 cutouts located thereat).

In the preferred embodiment, the airflow enhancing portions may take a variety of forms, which include open holes that allow air to flow freely, or relatively more freely that if airflow were obstructed or otherwise blocked. Airflow enhancing portions may allow air to pass completely through the pad, which may generally be referred to as ventilation openings, or completely along its length and width, from interior portions of the pad to the edge portions of the pad, including the lateral exterior edge, such structure being generally referred to as channels. In this manner, air may easily pass to all product containing boxes, whether they be located within an interior or exterior portion of the stack of boxes.

In a preferred method of making the honeycomb pad 200, the various airflow enhancing portions are formed in a single step, although other methods can include various steps. The single step preferably include producing these features using a 1-out die, although multiple out dies or other manufacturing methods can be used.

The die can also cut the facing 241 and core 242 at the lateral edges of the channels, and compress the top facing 241 towards the bottom facing 240 to crush the core 242 under the channel 220 to provide the desired channel depth 247. The portion of the core 242a under the channels 220 is thus a denser than the surrounding core 242. In this manner, a portion of the top facing 245 remains on a bottom of the channel 220 recessed from the external surface of the pad 200. An exposed vertical wall of the core 248 defines the lateral edges of the channel 220 in this embodiment.

In another embodiment, instead of the cut/crushed channels, the pad can be notched, such as by routing or another suitable process, to remove the first facing and part of the core down to the desired depth of the channel. In this embodiment, the channel floor may be open to the remaining portion of the core and honeycomb cells below it, instead of having a sheet closing the channel floor as is provided by the cut portion of the facing in the embodiment of FIG. 2. In the cells that are open to the channel is a notched embodiment could remain closed at their bottom side by the bottom facing. Other constructions of the channel can alternatively be employed, as well as channels that are partially or entirely covered, and channels that extend within a material or sheet of the pad.

The die punches the through holes 230 and perforations 210, cutting the edges thereof completely though the pad 200. Pins or similar features can perforate the panel to form the perforations 210. Further, square or rectangular shaped features can be used to cut through the panel 200 to form the through-holes 230. Other features on the die may likewise form other of the airflow enhancing patters onto a panel.

Thus, when this stamp or press is applied against an unformed panel, the perforations 210, the channels 220, and the enlarged flow areas 230 are simultaneously formed in one action, such as a stamping action. Many pads 200 may thusly be formed at high speed, for example on a conveyor system as will be known to those skilled in the art, from a supply of unshaped honeycomb panels. Alternatively, the panels may be submitted to the forces of more than one stamp or press, each such stamp or press forming less than all of the airflow enhancing features.

Figure 5:
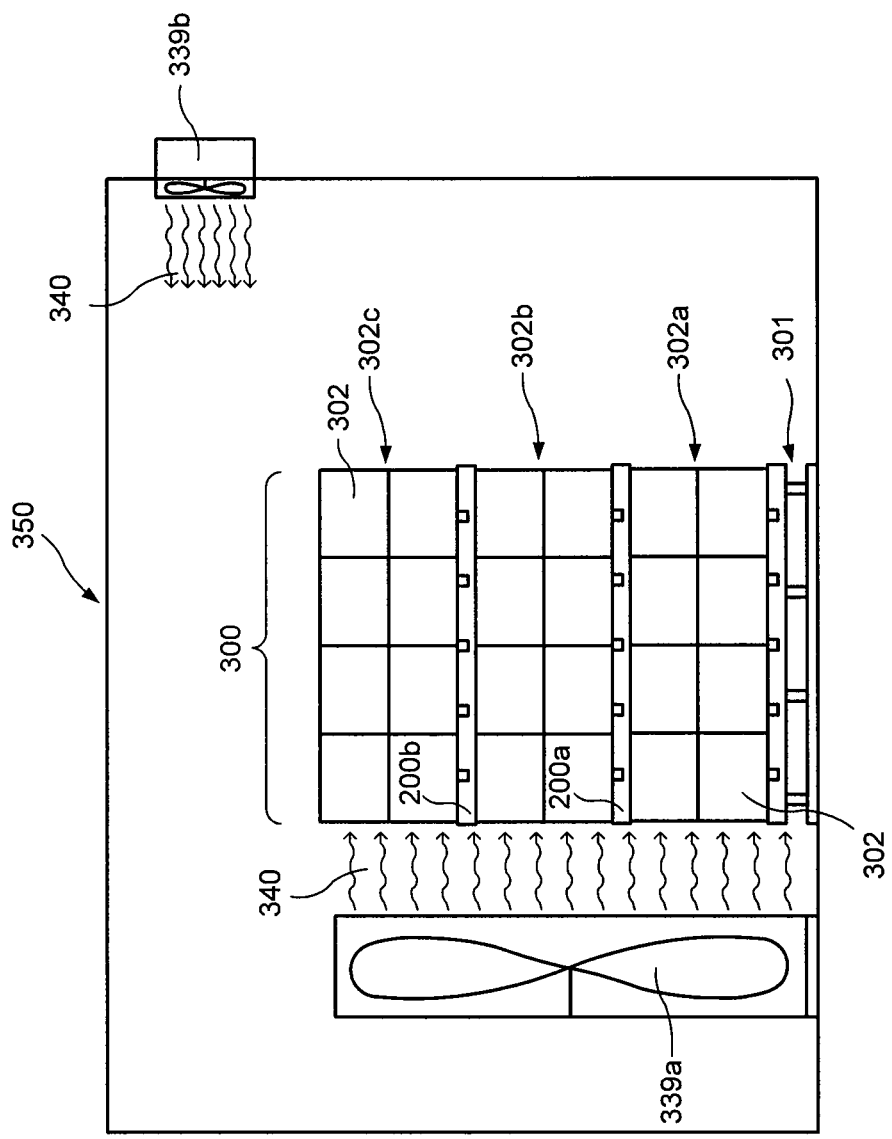
FIG. 5 illustrates an example configuration of stacked product-boxes with the airflow pads employed therebetween.

As shown in FIG. 5, the pads 200 can be used for boxed-product chilling operations. In an embodiment of such operation, a stack with boxes 300 to be cooled is refrigeration device 350 or room, with in some embodiments can be a blast freezer. One or more cooling fans 339a are positioned at various locations about the stack 300 to blow chilled air 340 towards, around, and through the stack 300. A cooling mechanism 339b provides chilled air to the room. In the preferred embodiment shown, a pallet 301, such as a wooden or other shipping pallet is positioned at the base of the stack 300 to support it. Airflow is possible through slits and openings between the slats in the pallet, which can help cool the bottom boxes 302.

Atop the pallet 301 are preferably stacked alternating layers of boxes and airflow pads 200. In sequential order, directly above the pallet 301 is a first layer of boxes 302a, a first airflow pad 200a, a second layer of boxes 302b, a second airflow pad 200b, and a third layer of boxes 302c. Each layer of boxes 302 can be a single or a multiple box layer. Preferably, each layer is a double layer, so each box has airflow at least on its top or bottom to speed cooling throughout the stack. Other layering of boxes and stacking arrangements can alternatively be used. Also, the horizontal extent of layers 302 may be approximately the same size as the pallet, although it may be larger or smaller, and the boxes are preferably packed up against each other in the layers for efficiency of space and so they do not need to be rearranged for shipping.

In the first layer 302a, the bottom sub-layer is in direct contact with airflow flowing through openings in the pallet. The top sub-layer of the first layer 302a, both sub-layers of the second layer 302b, and the bottom sub-layer of the third layer 302c are in direct contact with airflow flowing through the network or channels 220 and enlarged cooling areas 330, as well as airflow that flows vertically through the perforations 310. The topmost sub-layer, of the third layer 302c is in direct contact with the free airflow above the stack. Thus, cooling airflow can flow in direct contact with preferably all of the boxes in the stack, and in the embodiment shown, the number, size, and distribution of the airflow enhancing portions is selected to provide direct airflow contact through the pads at least with all of the boxes located horizontally on the interior of the stack, since exterior boxes have their lateral sides exposed to the cooling air.

The arrangement of layers and pads may be continued for any number of layers and pads, and in any configuration, though preferably constrained by the height of the transport vehicle in which they are to be shipped. Other considerations include the dimensions of any stacking or handling machinery (e.g., a forklift used) and size of the cooling room.

Once the boxes are chilled to the desired temperature, the entire stack can be loaded onto a truck, container, or other transport assembly or vehicle. The construction of the pads allows most of the structural material of the pads to be retained, even though channels and through-holes are provided, and provides a sufficiently low-cost pad that it can be used as a disposable airflow pad that does not need to be removed for shipping as was required with separator pads of the prior art.

As used herein, the terms "front," "back," and/or other terms indicative of direction are used herein for convenience and to depict relational positions and/or directions between the parts of the embodiments. It will be appreciated that certain embodiments, or portions thereof, can also be oriented in other positions.

In addition, the term "about" should generally be understood to refer to both the corresponding number and a range of numbers. In addition, all numerical ranges herein should be understood to include each whole integer within the range. Further, it will be appreciated that any drawings or figures presented herein are for illustrative purposes, and may not be to scale. While an illustrative embodiment of the invention has been disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. An airflow pad, comprising:
   first and second external facings of paper material, the first facing defining a main surface of the pad; and
   a low-density core of paper material sandwiched between and associating the external facings to provide stiffness to the pad;
   wherein the pad has edge portions on lateral sides of the main surface and an interior portion dispersed remotely from the edge portions and defines:
      a plurality of channels open at at least one of the edge portions, and extending generally parallel to and open through the main surface, and
      a plurality of ventilation openings disposed in the interior portion extending across the main surface and through the first facing, the core, and the second facing, allowing airflow therethrough, wherein the channels are connected to the ventilation openings to allow airflow between the ventilation openings and at least one of the edge portions.

2. The airflow pad of claim 1, wherein the low-density core comprises a honeycomb material.

3. The airflow pad of claim 1, wherein the low-density core comprises a corrugated material.

4. The airflow pad of claim 1, wherein the external facings comprise a high-density paper material.

5. The airflow pad of claim 1, wherein the plurality of channels are open at the lateral sides on opposite sides of the pad to allow airflow therebetween.

6. The airflow pad of claim 5, wherein the plurality of channels are open at the lateral sides on all sides of the pad to allow airflow therebetween.

7. The airflow pad of claim 1, wherein the plurality of channels are open across substantially the entire main surface.

8. The airflow pad of claim 1, wherein the plurality of channels comprise indentations recessed into and extending along the main surface and the first facing.

9. The airflow pad of claim 8, wherein the low density core under the plurality of channels is crushed.

10. The airflow pad of claim 9, wherein the first facing is cut on lateral sides of the plurality of channels such that a portion of the facing remains on a bottom of the plurality of channels recessed from the external surface of the first facing.

11. The airflow pad of claim 8, wherein the plurality of channels are recessed into the first facing and low density core.

12. The airflow pad of claim 1, wherein the plurality of ventilation openings include connected openings, and the plurality of channels connect with each other through the connected openings to allow airflow between the plurality of ventilation openings and the edge portion.

13. The airflow pad of claim 12, wherein the connected openings comprise enlarged flow areas of significantly larger cross-section than the plurality of channels to increase direct contact of the airflow with boxes stacked adjacent thereto, the connected openings extending perpendicularly to the facings through the pad and being open to the plurality of channels on a plurality of sides thereof to allow airflow thereacross.

14. The airflow pad of claim 13, wherein the plurality of ventilation openings include isolated openings that are uncommunicated to the plurality of channels.

15. A stacked airflow pad arrangement, comprising:
   the airflow pad of claim 1;
   a first object disposed against a first side of the pad; and
   a second object disposed against a second side of the pad, such that airflow is guided into the channel from the edge portions to both the first and second objects via the plurality of ventilation openings.

16. The stacked airflow pad arrangement of claim 15, wherein the first object is disposed below and supporting the pad, and the second object is disposed above and supported by the pad.

* * * * *

UNITED STATES PATENT AND TRADEMARK OFFICE
CERTIFICATE OF CORRECTION

PATENT NO. : 8,551,597 B2
APPLICATION NO. : 12/794387
DATED : October 8, 2013
INVENTOR(S) : Raymond A. Kowalski and John R. Welday It is certified that error appears in the above-identified patent and that said Letters Patent is hereby corrected as shown below:

Title Page in the Abstract:
    Line 7, "open at least one" should read --open at at least one--.

In the Specification:
    Column 3, line 34, "90 lb./sq. ft.," should read --90 lb./1000 sq. ft.,--.

Column 4, line 45, "channels are shown" should read --channels shown--.

Column 5, line 20, "each channels" should read --each channel--.

Column 5, line 21, "to a about" should read --to about--.

Column 5, line 29, "Through enlarged" should read --Enlarged--.

Column 5, line 60, "that that allow" should read --that allow--.

Column 5, line 60, "more freely that" should read --more freely than--.

Column 6, line 6, "include producing" should read --includes producing--.

Column 6, line 13, "thus a denser" should read --thus denser--.

Column 6, line 27, "embodiment could" should read --embodiment that could--.

Column 6, line 33, "though the pad" should read --through the pad--.

Column 6, line 38, "enhancing patters" should read --enhancing patterns--.

Column 6, line 52, "with in some" should read --which in some--.

Column 6, line 58, "shipping pallet is" should read --shipping pallet, is--.

Signed and Sealed this
Sixteenth Day of August, 2016

Michelle K. Lee
*Director of the United States Patent and Trademark Office*

Column 7, line 16, "310. The topmost sub-layer, of the" should read --210. The topmost sub-layer of the--.